United States Patent
Brune et al.

(10) Patent No.: US 6,810,045 B1
(45) Date of Patent: Oct. 26, 2004

(54) METHOD AND DEVICE FOR PROCESSING DATA PACKETS WHICH HAVE BEEN RECEIVED OR ARE TO BE TRANSMITTED ON A DATA CHANNEL

(75) Inventors: Thomas Brune, Hannover (DE); Klaus Gaedke, Hannover (DE); Siegfried Schweidler, Gehrden (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/623,053

(22) PCT Filed: Feb. 25, 1999

(86) PCT No.: PCT/EP99/01231

§ 371 (c)(1),
(2), (4) Date: Aug. 24, 2000

(87) PCT Pub. No.: WO99/45473

PCT Pub. Date: Sep. 10, 1999

(30) Foreign Application Priority Data

Mar. 2, 1998 (DE) .......................................... 198 08 680

(51) Int. Cl.[7] .................................................. H04J 3/00
(52) U.S. Cl. .................................. 370/498; 353/395.62
(58) Field of Search ................................ 370/233–235, 370/252, 253, 260, 263, 270, 516–518, 353, 498, 396–398, 261, 508, 413, 395.62

(56) References Cited

U.S. PATENT DOCUMENTS

| | | | | |
|---|---|---|---|---|
| 4,894,823 A | * | 1/1990 | Adelmann et al. | 370/252 |
| 5,450,394 A | * | 9/1995 | Gruber et al. | 370/253 |
| 5,467,342 A | * | 11/1995 | Logston et al. | 370/253 |
| 5,623,483 A | * | 4/1997 | Agrawal et al. | 370/253 |
| 5,694,397 A | * | 12/1997 | Burton | 370/516 |
| 5,699,519 A | * | 12/1997 | Shiobara | 709/235 |
| 5,805,602 A | * | 9/1998 | Cloutier et al. | 370/516 |
| 5,822,317 A | * | 10/1998 | Shibata | 370/395.62 |
| 6,006,270 A | * | 12/1999 | Kobunaya | 709/233 |
| 6,081,507 A | * | 6/2000 | Chao et al. | 370/235 |
| 6,212,206 B1 | * | 4/2001 | Ketcham | 370/516 |

FOREIGN PATENT DOCUMENTS

| | | | | |
|---|---|---|---|---|
| EP | 0444341 | 9/1991 | ............ | H04N/5/44 |
| EP | 0650269 | 4/1995 | ............ | H04B/7/185 |
| WO | 95/26596 | 10/1995 | ............ | H04J/3/06 |

* cited by examiner

*Primary Examiner*—Douglas Olms
*Assistant Examiner*—Van Nguyen
(74) *Attorney, Agent, or Firm*—Joseph S. Tripoli; Paul P. Kiel

(57) ABSTRACT

The invention relates to a way of implementing the so-called "late" check according to IEC 61883 in a link layer IC for the IEEE 1394 Serial Bus in a way which is favourable in terms of expenditure. According to the invention, a specific time model is used which, during the checking of the up-to-dateness of a data packet by comparison with the current bus time, also substantially simplifies the necessary comparison operations by virtue of the fact that it is possible to represent only sections of the time axis by means of a data word with limited bit length.

19 Claims, 3 Drawing Sheets

METHOD AND DEVICE FOR PROCESSING DATA PACKETS WHICH HAVE BEEN RECEIVED OR ARE TO BE TRANSMITTED ON A DATA CHANNEL

FIELD OF THE INVENTION

The invention relates to a method and a device for processing data packets which have been received or are to be transmitted on a data channel and which in particular contain time-critical data, so that the checking of the up-to-dateness of the data packet is highly significant.

BACKGROUND OF THE INVENTION

The invention is based on method for processing data packets which have been received or are to be transmitted on a data channel of the generic type of the independent Claim 1.

The term multimedia is used to refer to the current growing together of the product sectors of consumer electronics (hi-fi, video, audio) and personal computing, and many manufacturers from both sides are even pushing ahead with actual products. The fusion of the two product sectors means that work concerning the exchange of data between the pieces of equipment from the different product sectors is becoming more and more significant. This is also apparent from the efforts of standardization in this sector, which are already well advanced. In particular, the so-called IEEE 1394 Serial Bus is an internationally standardized and very widely accepted bus for data exchange between terminals from both product groups which is already available. The precise designation of the aforesaid standard is: IEEE Standard for High Performance Serial Bus, (IEEE Std 1394-1995, IEEE, New York, August 1996). The specification of the IEEE 1394 Serial Bus comprises a series of criteria which are highly significant for products from the sector of consumer electronics:

Virtually freely selectable bus topology (for example, chain, tree . . . ) with up to 63 terminals, bit-serial data transmission over a cable with 4 or 6 conductors with a maximum distance of 4.5 metres between two pieces of equipment, transmission rates of up to 400 Mbit/s at present, terminals can be connected and disconnected during operation.

In order to produce an IEEE 1394 interface it is necessary to implement two layers of the IEEE 1394 Standard using hardware: these are the physical layer and link layer which are known from the ISO/IEC-7-layer model. The connection to the bus is managed with the physical layer, while essential parts of the bus protocol are implemented in the link layer. Since a galvanic separation between the physical layer and the link layer is provided in the IEEE 1394 Standard, the implementation is generally effected using separate ICs.

When data are transmitted from the piece of consumer electronics equipment to another piece of equipment, an isochronous data transfer takes place in which a quantity of data have to be transmitted on a regular basis under real-time conditions, since the corresponding application of the data proceeds without faults only if the data have arrived at the correct time and can correspondingly also be processed correctly. Therefore, a special standard has been developed for the exchange of such data. This standard is known under the designation IEC-61883 (Consumer Audio/Video Equipment-Digital Interface). The precise designation of this standard is: IEC-61883-1: Consumer Audio/Video Equipment-Digital Interface (Draft) IEC., September 1997. In it there is provision for data packets to be provided with a so-called time stamp. This time stamp relates to the bus time of the IEEE 1394 Serial Bus and specifies the precise time at which a data packet is to be output to the application via the bus after the transmission. For the production of a link layer IC with implemented IEC 61883 functionality this means that a series of additional functions have to be implemented. In particular, these are:

The time stamp is generated during the transfer of the packet to the link layer IC, the time stamp is checked before the transmission of the packet via the IEEE 1394 Serial Bus ("late check" during the transmission of packets), the received packet is output to an application ("late check" during the reception of packets) under the control of time stamps.

Here, the generation of the time stamps is the simplest of the three enumerated tasks. This task can be achieved by simply adding an offset to the IEEE 1394 bus time which is available on a standard basis in the link layer IC. The current time stamp is then formed for a packet to be sent, and is stored, in addition to the data of the packet, in the memory of the link layer control IC.

The checking of the time stamp of a packet located in the memory, before the transmission over the IEEE 1394 Serial Bus, or secondly after the reception before the data packet is output to the application, is significantly more complex. The purpose of the first check is that a packet which can no longer reach the destination system at the correct time owing to the delay during the processing of previous packets is no longer output onto the IEEE 1394 Serial Bus. This would only load the bus unnecessarily. The second check brings about synchronization of the received data packets before they are output to the application.

The implementation of the two last mentioned checks gives rise to a considerable portion of the hardware complexity of the complete link layer IC.

SUMMARY OF THE INVENTION

Taking the abovementioned prior art as a starting point, the object of the invention is to specify a method and a device for processing data packets which have been received or are to be transmitted on a data channel, which method in particular reduces the costs for the implementation of the circuit unit which performs the checking of the up-to-dateness of the data packets, and operates reliably.

The part of the object which is directed to the method is achieved according to the invention by the measures which are given in Claim 1. The specified solution makes it possible to implement a single module which can carry out both of the previously explained checks in the time-division multiplex mode. One and the same unit is used for the aforesaid checking during the reception and transmission of data packets. A significant aspect of the invention consists in the fact that at the time of checking the up-to-dateness of a data packet, in both types of check initially the current system time (bus time) is determined and, on the basis of this time, the time axis is divided into at least the "correctly timed" and "delayed" regions, and a check is then made to determine the region in which the processing time (time stamp) entered in the data packet lies. The advantage of this solution consists in the fact that the implementation for the circuit part or the module which has to perform the previously explained checks of the time stamps requires significantly less expenditure on hardware than is the case in a solution in which the time axis is not divided into regions and the time stamps of the data packets of an isochronous data transmission have to be checked by means of a large number of individual comparisons in conjunction with additions and subtractions as well as considerations of limiting values with intermediate storage steps.

This is mainly due to the fact that for a real system it is not possible to represent the time (bus time of the IEEE 1394 Serial Bus) from zero to infinity, but rather the time is represented by a limited number of bits (namely 25 bits) according to the IEC 61883 Standard. When a timing clock of 25 MHz is used, the time period which can be represented with 25 bits is only one second. The bus time must therefore continually be reset and updated. During the transmission of isochronous data over the bus, the application in the piece of equipment which is operating as transmitter will assign to each data packet a time stamp which is projected into the future relative to the current bus time, the offset having been determined in such a way that the transmission time which is necessary in all probability is taken into account and the data packet nevertheless still arrives early enough at the receiver. However, the signal processing or even excessively high bus loading may give rise to delays. For this reason, checking of the time stamp in terms of the up-to-dateness of the data packet must also take place in the receiver. In this process, the current bus time is then determined and it is ascertained relative thereto whether the time stamp of the data packet is still sufficiently far from the current bus time. If the time had been represented with sufficiently long data words, this comparison would be easy to carry out. However, since the time can only be represented with 25 bits, it may be the case that the current bus time is already situated towards the upper edge of the time period which can be represented, and the data packet has a time stamp which lies in the proximity of the origin of the time axis of the next time period. Thus, with simple larger/smaller comparisons it is no longer possible to determine whether the data packet is up to date or not. Specific calculations must be performed which also take into account that a "reset" of the bus time has been performed at a specific time.

The case in which the up-to-dateness of the data packet is checked when it is to be transmitted onto the bus is similar. In this case also, when the bus is heavily loaded it may be found that a data packet remains for a relatively long time in the buffer of the transmitting equipment. The data packet can only be transmitted if the bus is reserved for this piece of equipment, and it is then necessary to check once more whether its transmission is still necessary at all or whether it would in any case be transmitted too late for the destination system. With this check, the same problems may also arise as those previously mentioned. Simple additions/subtractions or comparisons between the values to be compared are also no longer possible here.

In accordance with the inventive method, the portion of the time axis which can be represented with 25 bits is divided into various regions. This is carried out on the basis of the current bus time at the time of the check. Since the precise position of the regions and their significance is known, the comparison operations can be simplified and it is possible to determine whether or not the data packet is still up to date. An appropriate reaction can then take place.

Further improvements of the method are possible by virtue of the measures disclosed in the dependent claims. For the correctly timed transmission of data packets it is particularly advantageous if a "delayed" region is also arranged between the "correctly timed" region and the current system time. This "delayed" region is used to take into account the bus transmission time which is absolutely necessary. The data packet is then not output at all if the current bus time is only just before the time stamp entered into the data packet, and sufficient transmission time would no longer be available.

In order to check the outputting of a received data packet to the application, it is very advantageous if a "soon" region is arranged between the "delayed" region and the current system time. As soon as it is determined that the current bus time lies in the "soon" region, a precise counter can then be set directly to a specific value and started, said counter counting the time remaining up to the precise time when the data packet is output. Advantageous measures in conjunction with this are also specified in Claims 9 and 10. The measures according to Claims 12 and 13 make it possible to adapt the limits of the regions flexibly to the actual conditions in the network. If there is actually only a low level of bus traffic, the region which allows for the actual transmission time can also be adaptively decreased if appropriate.

By means of the measure according to Claim 14, the checking of the data packets can be, further simplified. By virtue of the fact that, for example, three possible configurations for the division of the time axis into the "correctly timed", "delayed" and "soon" regions are distinguished, it is possible to detect immediately without further comparison which of the regions has been split up into two sections by the overflow of the 25 bit word. This then clarifies the regions in which it is possible to operate with simple additions and subtractions or greater/smaller than comparisons for the checking of the up-to-dateness of the data packet.

One advantage of the method according to the invention is also that the division of the time axis into the aforementioned regions for the two previously mentioned types of checking in the receiver and in the transmitter appears the same in each case and can thus be carried out by the same hardware if both checks are necessary in one piece of equipment. As a result of this the implementation of the module is also simplified.

The part of the object of the invention which relates to the device for processing data packets which have been received or are to be transmitted on a data channel is achieved by means of the measures in Claim 16. Further advantageous measures in this respect are listed in the dependent Claims 16–19.

BRIEF DESCRIPTION OF THE DRAWINGS

Exemplary embodiments of the invention are illustrated in the drawings and explained in more detail in the following description. In the drawings.

DETAILED DESCRIPTION OF THE INVENTION

Figure 1:
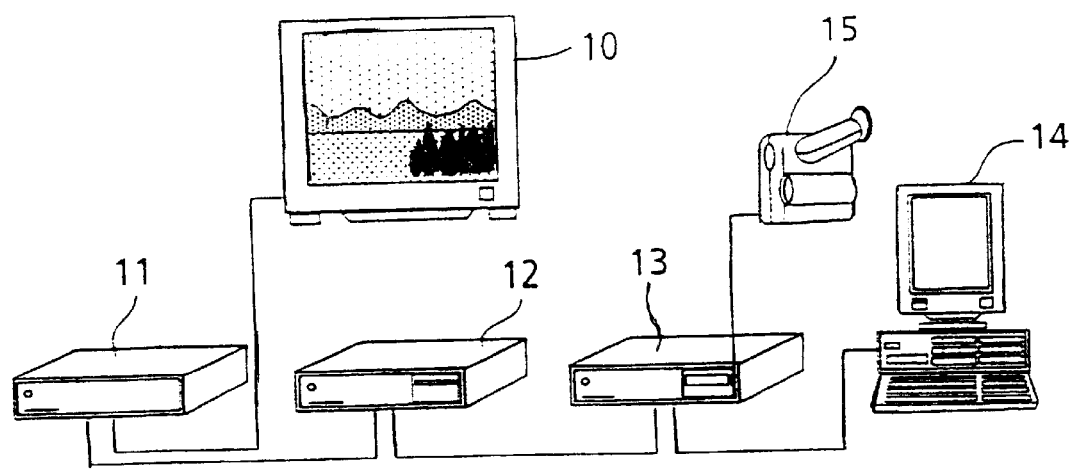
FIG. 1 shows an example of a group of pieces of equipment which are linked to one another via a serial bus.

The IEEE 1394 serial data bus which has been developed is used to network a w de variety of equipment which can be found in a domestic household. One example of such a network is illustrated in FIG. 1. The reference number 10 designates a conventional television set. The reference number 11 designates a satellite receiver for receiving television channels. The reference number 12 designates a DVD player. The reference number 13 designates a video recorder and the reference number 14 designates a personal computer. Finally, the reference number 15 designates a camcorder which can also be connected to the video recorder. There is a bus link to each of the pieces of equipment. In the case of the pieces of equipment 11, 12, 13, there are two connections to bus lines in each case. These pieces of equipment then operate as transit points while the other pieces of equipment 10, 14, 15 constitute terminals in terms of the data traffic. For the many other properties of the IEEE 1394 Bus (type of addressing, frame format, possible bus topology, arbitration methods, the precise details of the bus protocol etc.) the standard whose precise reference was mentioned at the beginning should be referred to. How the data transfer of isochronous data packets takes place is essential to the invention. Such data traffic occurs, for example, when data are being transferred from the satellite receiver 11 to the video recorder 13. Isochronous data traffic occurs whenever audio/video data of a programme or video have to be transmitted.

Figure 2:
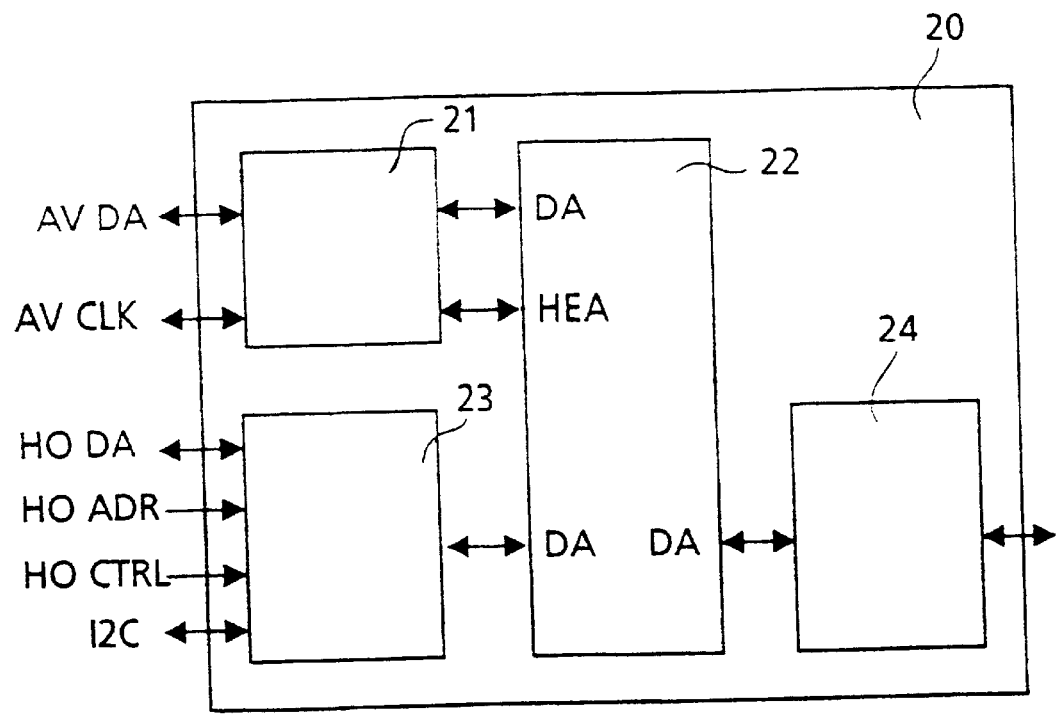
FIG. 2 shows a block circuit diagram of a link layer IC for the IEEE 1394 Bus.

FIG. 2 shows the block circuit diagram of the link layer IC for the IEEE 1394 Bus. In addition to the standardized interface to the physical layer 24, the circuit has a parallel bidirectional 8-bit host interface 23. The IC, which can be programmed by register, is initialized and the operation is controlled via this interface. In addition, an interface for the I2C Bus is provided in this unit. In order to connect the respective application to the IEEE 1394 Bus, the link layer IC has a further bi-directional audio/video interface 21. This interface is configured in such a way that it can either output or receive 8 bits either in parallel or in bit-serial fashion with an application-specific clock which is isochronous with respect to the other IC clock. Furthermore, it performs the formatting for a plurality of video and audio data transmission formats which are standardized in the IEC 61883 standard. This interface is configured in such a way that it is also suitable for transmitting data which are formatted according to the MPEG-2 standard. Data which are formatted according to the data processing standard can also pass through this interface.

The part of the link layer IC which is essential to the invention is the unit 22, which contains both the volatile memory and the control unit for the memory access, including the evaluation unit for the checking of the up-to-dateness of data packets. The Implementation of this evaluation unit is based on a rime model which relates to the complete time range used in the IEC 61883 standard. The model will now be explained in more detail with reference to FIG. 3.

In the model, the current IEEE 1394 Bus time constitutes a mark on which a validity range is superimposed in the direction of the positive time axis. The current bus time is designated by the reference number 33. The validity range, which is also often referred to as "correctly timed" region below, is designated by the reference number 32. The validity range with a specific width is then followed by the "delayed" range, which has the reference number 3C. As illustrated in FIG. 3a, this range extends from the upper limit of the validity ranae in the positive direction of time up to the edge of the time range which car be represented (the edge of the time range which can be represented is indicated by XXXX). In addition, it also extends from the start of the time range which can be represented as far as the current bus time 33. Between the "correctly timed" region 32 and the current bus time 33, a second "delayed" region 31 is also arranged. This region is used to take into account the transmission time of a data packet which is necessary with a high probability when the data packet is transmitted onto the bus.

For the second necessary function of the unit, namely the synchronized outputting to an application after the data packet has been received via the bus, this region is on the other hand also referred to as the "soon" region. If it is determined later that the time stamp of a data packet which has been received from the bus lies in this region at the time of checking, a precise counter is started in the AV interface 21, and after it has been decremented to zero it causes the data packet to be output to the application. More details will be given later. In the time model, the aforementioned regions and also the marking for the current bus time move along the time axis corresponding to the progress of the current bus time. In contrast, the time stamp of the data packet under consideration is assumed to be fixed in the time model. This marking is designated by the reference number 35 in FIG. 3. In the application in which a data packet is to be transmitted onto the bus, an instantaneous recording of the time model is performed. If the time stamp of the data packet is located within the validity range 32, the data packet is identified as valid and the transmission onto the bus is brought about. If, on the other hand, the time stamp is detected outside the validity range in one of the "delayed" regions, the corresponding data packet is no longer transmitted via the bus.

The checking takes place as follows. Firstly, a current bus time is determined. Then, the time axis is divided into the aforementioned regions on the basis of the bus time. For this purpose, a first offset, which specifies the interval between the bus time and the lower limit 34 of the "correctly timed" region, is added to the bus time. In addition, a second offset, which specifies the upper limit of the "correctly timed" region, is added to the current bus time. The corresponding numerical values of the limits are stored. During the addition, it is, however, necessary to ensure that the time axis constitutes only a limited time period. It is therefore necessary to add in such a way that when there is an overflow during the arithmetic operation the remainder is added to the value zero and this value is thus stored as the value of the time limit. When the dividing of the time axis into the regions has been performed, only the time stamp of the data packet is then read and compared with the limiting values. 3 different cases are distinguished here. As is specified in FIGS. 3a–3c it may in fact be found that either the first "delayed" region 30 has been divided into two sections by the overflow, or the "correctly tamed" region 32 (see FIG. 3b) or the second "delayed" region 31 (see FIG. 3c) has. Here, it is to be noted that in FIG. 3c the scale for the second "delayed" region 31 has been selected differently, so that the essential features can be seen more easily. Otherwise, the "delayed" region 31 would have to be represented more narrowly.

Figure 3:
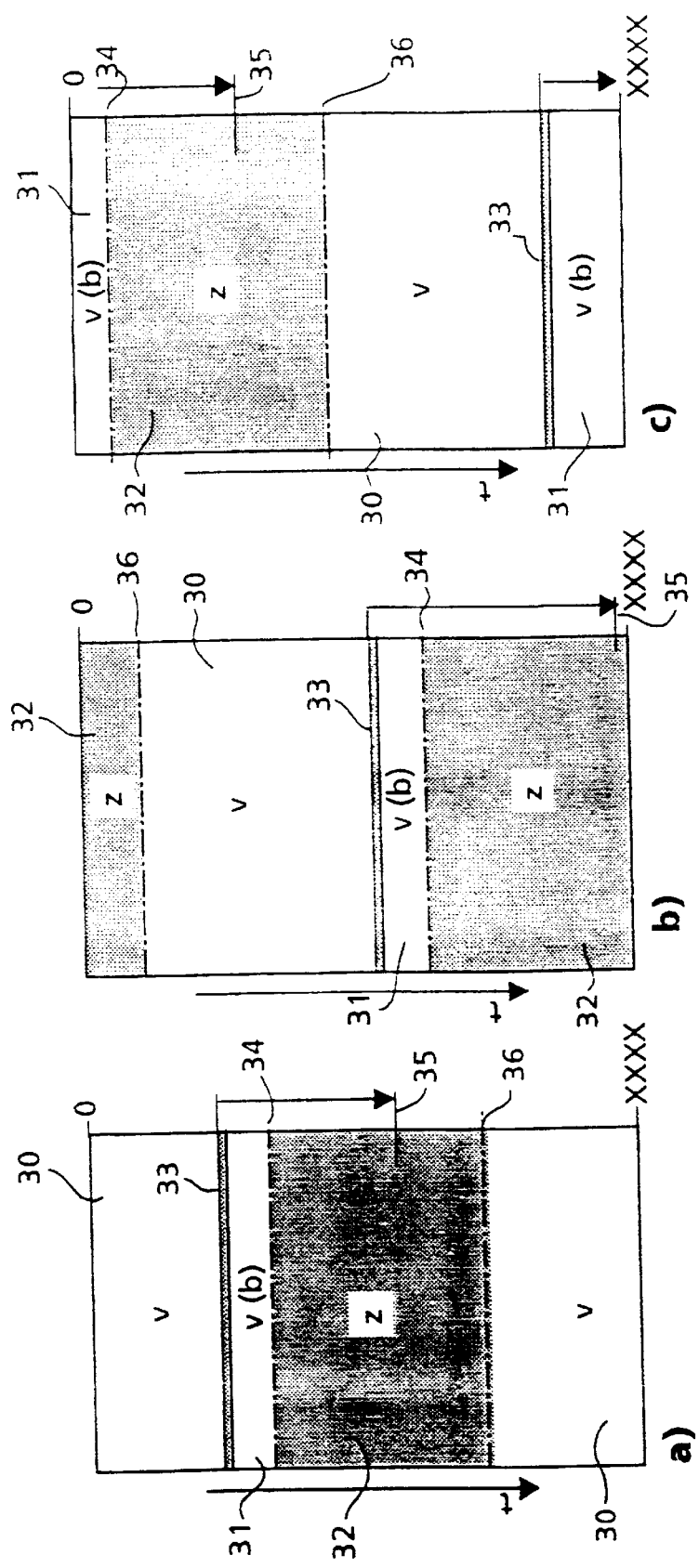
FIG. 3a shows a first division of a portion of the time axis into various regions relative to the specific bus time.
FIG. 3b shows a second division of the portion of the time axis into regions relative to a specific different bus time.
FIG. 3c shows a third division of the portion of the time axis into regions relative to a third specific bus time.

After the d-vision of the time axis into the regions has been performed, it is then determined which of the three cases illustrated in FIG. 3 applies. For this purpose, it is checked whether, as in FIG. 3a, the two limits of the "correctly timed" region are greater than the value of the current bus time or, as represented in FIG. 3b, only the lower limit is greater and the upper limit is smaller than the current bus time, or as in FIG. 3c, both limits are smaller than the current bus time. After it has been determined which of the three cases applies, it is immediately clear which of the aforementioned regions has been split into two sections by the overflow during the offset addition. For example, in the case according to FIG. 3a, it is immediately clear that the data packet is delayed if the time stamp of the data packet is smaller than the current bus time. However, if the lime stamp is greater than the current bus time, one of the cases of "delayed" 31, "correctly timed" 32, or "delayed" 30 applies, and individual comparisons with the stored time limits of the "correctly timed" region must be performed. In the case of FIG. 3b, it is necessary in each case to analyse more precisely to determine in which of the regions the time stamp of the data packet lies. On the other hand, in the case according to FIG. 3c it is clear immediately that the data packet is delayed if the time stamp of the data packet is greater than the current bus time. If it is smaller, individual comparisons must correspondingly be made again with the stored time limits. For all three cases there are separate algorithms with which it is possible to determine, in a way which is favourable in terms of effort, in which of the regions the time stamp of the data packer lies. For example, in the case according to FIG. 3a, it is initially checked whether the time stamp is smaller than the current bus time. If it is, it is clear that the data packet is delayed. If it is not, it is checked whether the time stamp is greater than the lower limit of the "correctly timed" region. If it is not, it is clear that the data packet is delayed. If it is, it is additionally checked whether the time stamp of the data packet is greater than the upper limit of the "correctly timed" region. If it is, it is also clear that the data packet is delayed; if not it is clear that the data packet is correctly timed. The corresponding algorithms for the cases in FIGS. 3b and c can be taken in each case from FIGS. 3b and c themselves, and do not need to be explained individually.

Figure 4:
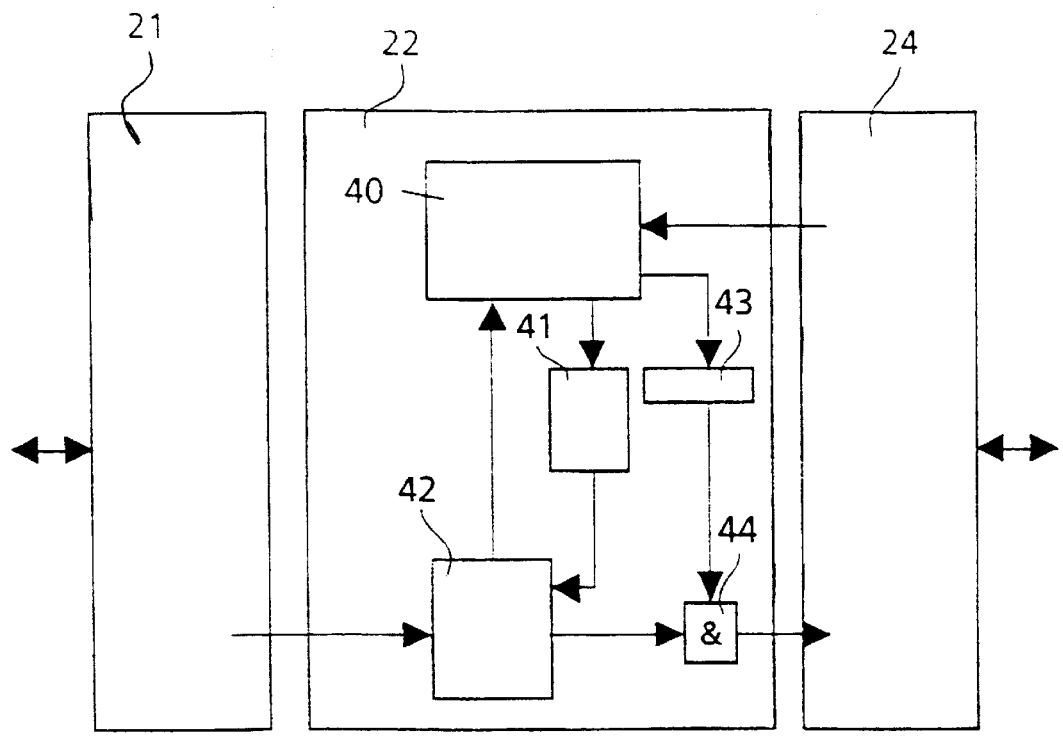
FIG. 4 shows a first block circuit diagram of the link layer IC for the IEEE 1394 Bus in which all the essential components which are necessary for the checking of the up-to-dateness of a data packet during the transmission of a data packet onto the bus are represented.

FIG. 4 illustrates once more the essential components for checking the up-to-dateness of the data packets in the equipment which is to be transmitting. Identical reference numbers designate he same as in FIG. 2. The reference number 40 designates the evaluation unit which carries out the various comparison operations. The reference number 42 designates the buffer (RAM). The reference number 41 designates a memory access control unit. The reference number 44 designates a reading unit which carries out, as it were, a logic AND operation. The reference number 43 designates an interrupt register.

The AV interface 21 writes a data packet which-it wishes to transmit via the bus into the memory 42. In the process, said interface 21 has entered into the data packet the time stamp which it has determined by offset addition. This also takes place again on relation to the current bus time, which is also available to the AV interface. The evaluation unit 40 requests a data transmission via the bus, which is carried out in co-operation with the IEEE 1394 interface 23. If the bus is available to the subscriber station, the evaluation unit 40 reads out from the memory 42 the data packet which is to be transmitted, and carries out the check of the up-to-dateness of the data packet as previously described. If it is determined here that it is already too late to transmit the packet, the evaluation unit 40 generates a corresponding signal and passes this onto the memory access control unit 41. In response, the next data packet which is in line to be transmitted is read from the memory 42. If the result of the check here was that the time stamp of the data packet lies in the "correctly timed" region, a corresponding signal s passed onto the memory access control unit 41 and is released from there for the reading operation. The data packet is passed on to the IEEE 1394 Bus interface and transmitted via the bus. Given a specific number of data packets which are successively delayed, a bit is set in the interrupt register 43 by the evaluation unit 40. As a result, reconfiguration of the system and/or error recovery is brought about.

Figure 5:
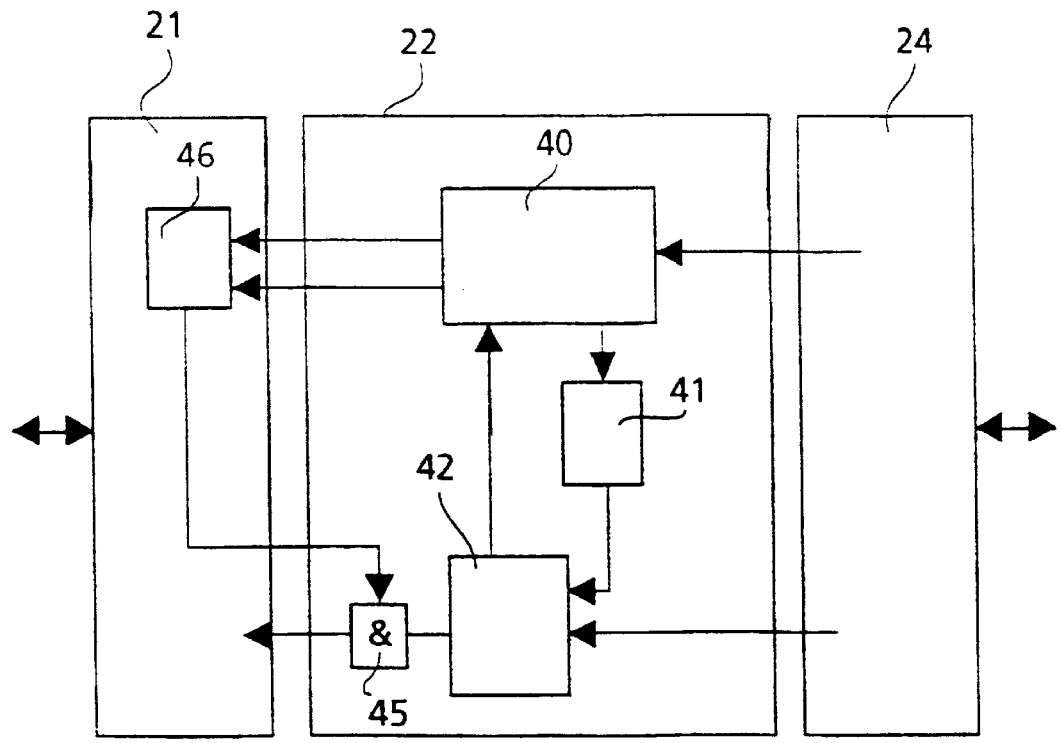
FIG. 5 shows a further block circuit diagram of the link layer IC for the IEEE 1394 Bus with all the essential components which are necessary for checking the up-to-dateness of a data packet in a receiving unit for data packets.

In FIG. 5, the same reference numbers designate the same components as In FIG. 4 and in FIG. 2, respectively. FIG. 5 serves to explain the checking in a piece of equipment which has received data from the serial bus and then checks whether the data have been received at the correct time and, if so, passes on the associated data packet to the application at the correct time. For this purpose, a counter unit 46 is also provided in the AV interface 21. Data packets which are received on the bus interface 24 are written into the memory 42. The memory access control unit 41 reads the data packets out in series and passes them on to the evaluation unit 40. In the evaluation unit 40 it is then checked whether or not the data packets have been received at the correct time. The checking takes place in the way which has been previously explained. If it is determined that the time stamp of the respective data packet lies in the "delayed" region 30, the corresponding data packet in the memory 42 is cleared. If it has been determined that the data packet lies in the "correctly timed" region, the data packet s left in the memory but is not yet passed on to the application. The precise counter unit 46 in the AV interface 21 is only set with the precise value which corresponds to the difference between the current bus time and the time stamp of the data packet if it has been determined during a subsequent check that the time stamp of the data packet lies in the "soon" region. At the same time the counter is started. Then, the outputting of the data packet to the application takes place under the control of the counter unit 46. If the counter has expired, i.e. the stamped time of the data packet has arrived, a corresponding signal is transmitted to the reading unit 45, and the data packet is thus passed on to the application. The triggering of this action via the counter unit 46 takes place with a high degree of precision and time resolution. In this way, ail the received data packets are processed in series.

Theoretically, it is possible for packets to remain in the memory for a relatively long time period and to become valid again after the bus time has been reset. Owing to the representation of the IEC 61883 time stamps with 25 bits and a time clock of 25 MHz, this state may however occur if a packet is buffered for more than one second. This is equivalent to an error state, since in this case the data traffic over the IEEE 1394 Serial Bus is disrupted.

In the IEC 61883 standard for the transmission of MPEG-2 data, a minimum size of the buffer of 3264 bits for the buffering of data is provided. The problem here is the bandwidth requirement on the memory module which is implemented and which for technological reasons can be operated at only 43 MHz clock frequency with the target technology which is used (0.5 $\mu$m CMOS standard technology). With the AV interface link-physical interface, header generation according to IEC 61883 standard and host interface, there are four different sources and sinks on he chip, which all access the buffer simultaneously with different bandwidth requirements. The bandwidth requirements result here on the one hand from he IEEE 1394 specification and on the other hand from the specifications for the AV interface. For the sake of area-efficient implementation, no dual or quad-port RAM has been used. Instead, the bandwidth requirements of the various units are fulfilled by organizing the memory module with a word length of 16 bits and dividing up the time for the access possibilities or the various sources and sinks. Here, a specific number of access possibilities is allowed to each source and sink according to a fixed scheme within 16 cycles of the IC clock.

Various modifications of the described exemplary embodiments are possible. For example, the width of the regions may be designed to be adapted under the control of statistics which are generated in the evaluation unit 40.

The time model which has been explained can also be modified and divided into other/further regions.

The invention can also be used for wire-free bus systems and other wire-bound bus systems.

What is claimed is:

1. Method for processing data packets which have either been received on a data channel or are to be transmitted on the data channel, a processing time relative to a system time which is known in the system being assigned to the data packet, the up-to-dateness of the data packet being checked before the further processing, wherein at the time when the up-to-dateness of the data packet is checked a portion of the time axis is divided at least into a "correctly timed" region and a "delayed" region on the basis of the current system time, the "delayed region" being arranged chronologically before the current system time, and a check is made to determine the region in which the processing time of the data packet lies, and corresponding further processing is performed.

2. Method according to claim 1, the "correctly timed" region being arranged chronologically after the current system time.

3. Method according to claim 1, a "delayed" region being arranged between the "correctly timed" region and the current system time.

4. Method according to claim 1, a "soon" region being arranged between the "correctly timed" region and the current system time.

5. Method according to claim 4, the "soon" region being identical to the "delayed" region between the current system time and the "correctly timed" region.

6. Method according to claim 1, the data packet being released for transmission on the data channel if it has been determined that the processing time of the data packet lies in the "correctly timed" region.

7. Method according to claim 1, the data packet being blocked from being transmitted on the data channel if it has been determined that the processing time of the packet lies in the "delayed" region at the time of checking.

8. Method according to claim 4, the received data packet being released for passing onto an application if it has been determined that the processing time of the data packet lies in the "soon" region at the time of checking.

9. Method according to claim 8, in which, when the data packet is released for passing onto the application, a counter is set with a value which specifies the remaining time up to the occurrence of the processing time, the counter is started and, when the counter expires, a signal is generated which causes the data packet to be passed on to the application.

10. Method according to claim 1, in which a data word of a specific length, in particular 25 bits, is used to represent the system time, and the time axis is represented in each case only in certain sections by the possible numbers corresponding to the length of the data word.

11. Method according to claim 4, the size of the "correctly timed", "delayed" and "soon" regions being predefined.

12. Method according to claim 11, the region limits of the "correctly timed", "delayed" and "soon" regions being configured so as to be programmable.

13. Method according to claim 11, in which, in the division of the time axis into the "correctly timed", "delayed" and "soon" regions, a number of possible configurations is distinguished, and information indicating which configuration is present at the checking time is stored in order to simplify the analysis to determine in which region the processing time lies.

14. Method according to claim 13, in which three possible configurations are distinguished depending on whether the "delayed" region or the "correctly timed" region or the "soon" region has been split into two regions as a result of the overflow of the data word for representing the system time.

15. Device for carrying out the method according to claim 1, having an interface for the data channel, having an interface for the application, having a memory arrangement in which the data packets are buffered, wherein an evaluation unit is provided which divides the time axis into the "correctly timed" region and the "delayed" region on the basis of the current system time, and determines in which region the processing time lies, and brings about corresponding further treatment.

16. Device according to claim 15, in which reading means are provided which release the data packet for transmission on the data channel if at the time of the checking it has been determined that the processing time of the data packet lies in the "correctly timed" region.

17. Device according to claim 15, in which switching means are provided which block the data packet from being transmitted on the data channel if at the time of the checking it has been determined that the processing time of the data packet lies in the "delayed" region.

18. Device according to claim 15, the evaluation unit further dividing the time axis into a "soon" region, and further comprising reading means being provided which release the data packet to an application if at the time of the checking it has been determined that the processing time of the data packet lies in the "soon" region.

19. Device according to claim 18, in which counting means are provided which, when the data packet is released for passing onto the application, are set to a value which specifies the remaining time up to the occurrence of the transmission time, the counting means being started and, after expiry, generating a signal which causes the data packet to be passed on to the application.

\* \* \* \* \*